Feb. 8, 1966  O. M. ELLIOTT  3,233,663
REGENERATIVE HEAT EXCHANGE APPARATUS
Original Filed April 12, 1962  2 Sheets-Sheet 1

INVENTOR.
ORRIN M. ELLIOTT
BY Donald R. Johnson
ATTORNEY

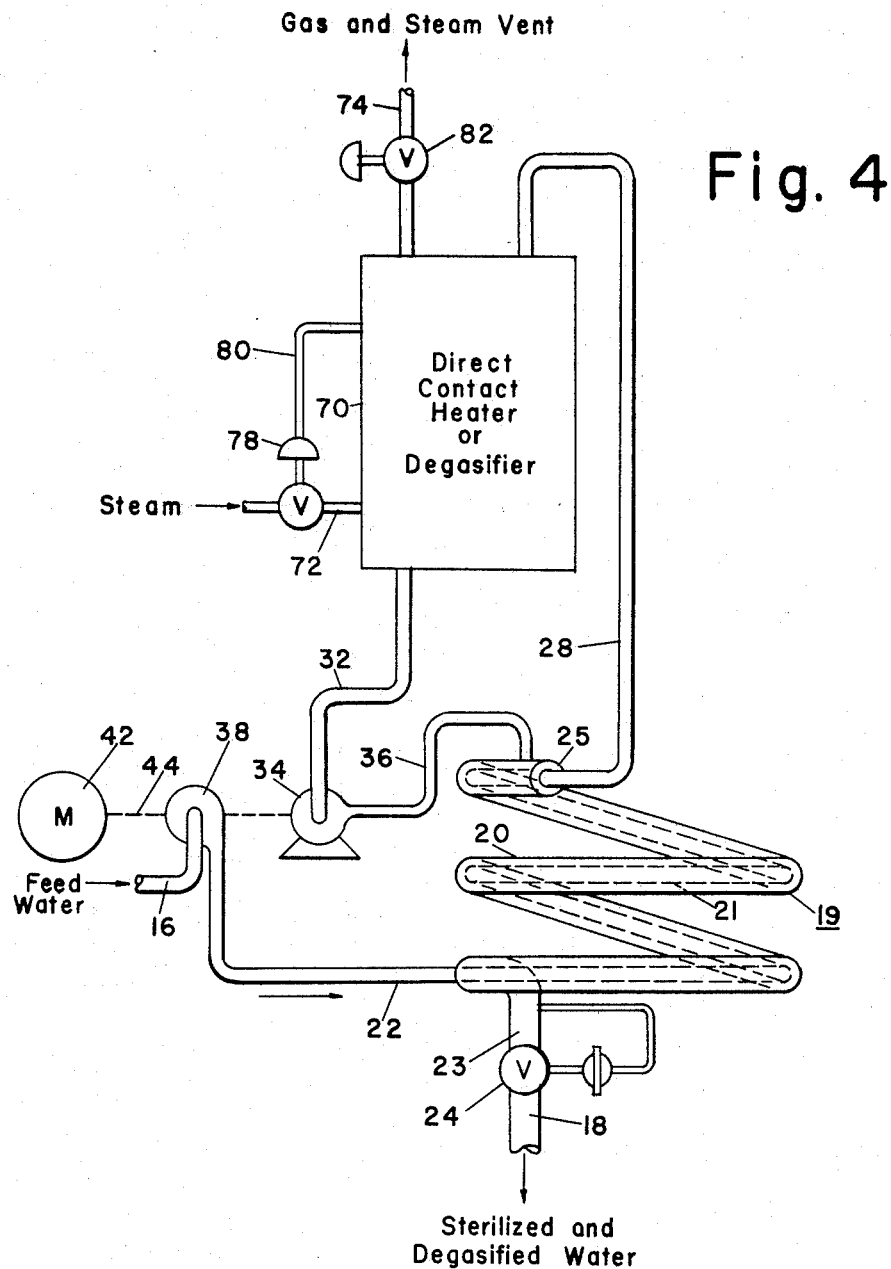

United States Patent Office 3,233,663
Patented Feb. 8, 1966

3,233,663
REGENERATIVE HEAT EXCHANGE APPARATUS
Orrin M. Elliott, Media, Pa., assignor to Sun Oil Company, Philadelphia, Pa., a corporation of New Jersey
Original application Apr. 12, 1962, Ser. No. 188,613 Divided and this application Sept. 8, 1964, Ser. No. 400,297
2 Claims. (Cl. 165—66)

This application is a division of the copending application Serial No. 188,613 filed April 12, 1962 by the present inventor, which latter application was a continuation-in-part of the abandoned application Serial No. 793,761 filed February 17, 1959, by the present inventor.

The present invention relates to heating and cooling apparatus for water or other liquids, employing regenerative heat exchange in order to control the amount of heat required and to provide cooling of the liquid from its maximum temperature.

The invention is particularly useful in connection with vacuum type distillation apparatus for the recovery of potable water from sea water. The invention in one embodiment provides a manner of insuring freedom from bacteria in distilled water obtained from vacuum type distillation apparatus.

Vacuum type distillation apparatus produces distilled water which in some instances is not sterile. In some cases, the unsterile condition results from entrainment and the use of a temperature in the distillation which is not high enough to kill bacteria. On the other hand, even if the distillation temperature is high enough to kill bacteria, the distillate may become contaminated by leakage of unsterile cooling water from the cold side of the condenser into the distilled water on the hot side.

It is therefore often desirable, in conjunction with vacuum type distillation apparatus for the production of potable water, to sterilize the distillate which is obtained. The present invention provides an economical manner of thermally sterilizing the distilled water by regenerative heat exchange between the sterilized water effluent from the heater and the water feed to the heater.

Ordinary thermal sterilization is subject to the disadvantage that leaks in subsequent cooling equipment may again result in contamination of the sterilized water with unsterilized cooling water. According to the present invention, novel apparatus is provided to insure freedom from bacterial contamination while providing economical thermal sterilization in a simple and easily constructed system. The invention is particularly beneficial as applied to distilled water obtained in vacuum distillation apparatus, but it is also useful in thermal sterilization apparatus generally, as well as in chemical reaction apparatus as discussed subsequently.

Figure 1:
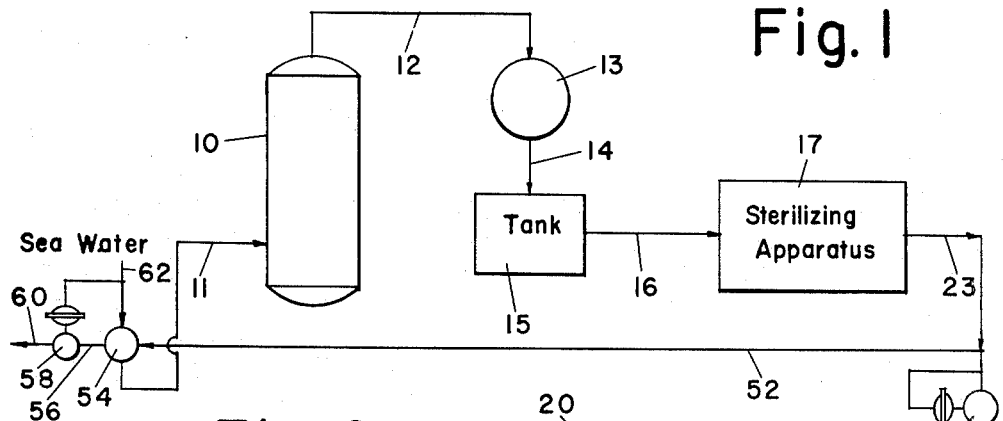
Figure 2:
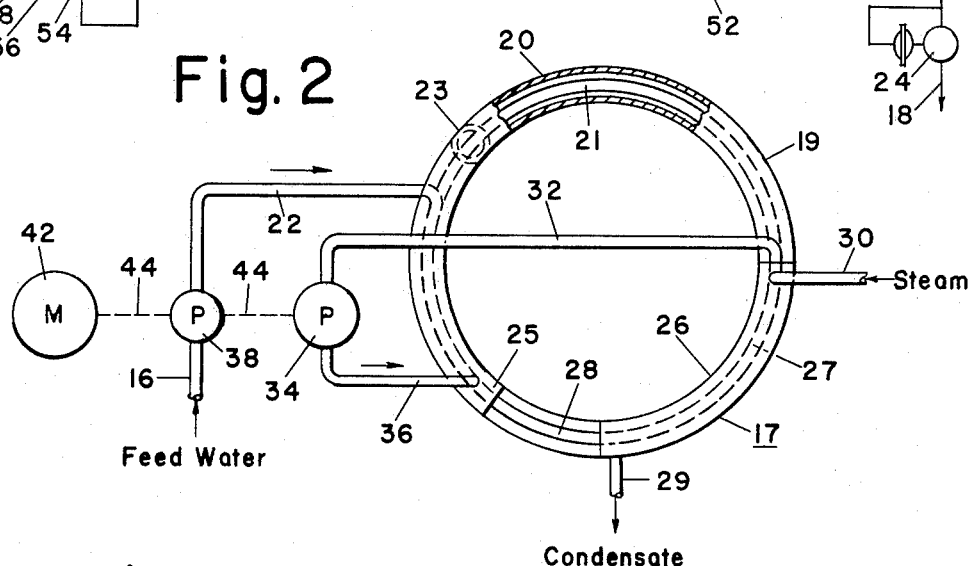
Figure 3:
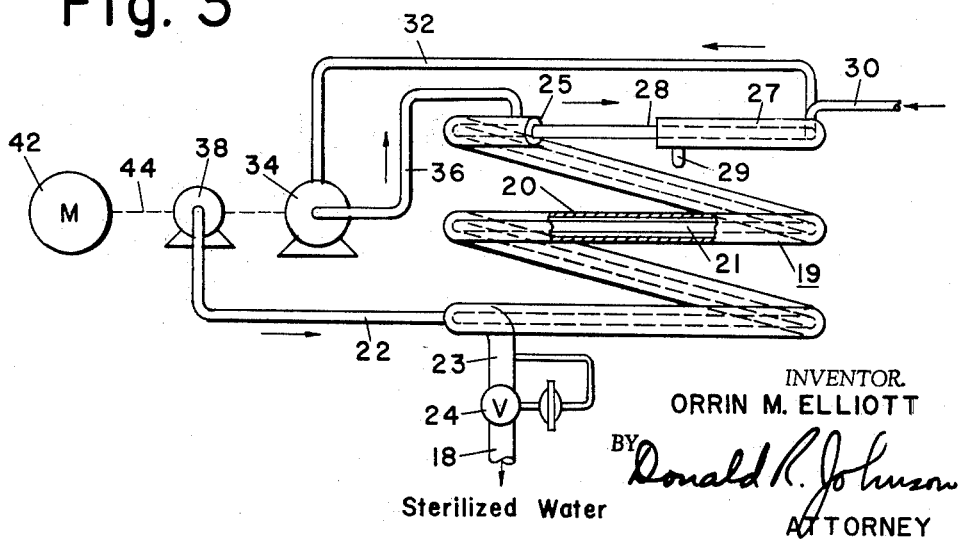

The invention will be described further in connection with the attached drawings, wherein FIGURE 1 illustrates a vacuum distillation apparatus for obtaining potable water from sea water and indicates generally a sterilizing apparatus employed to thermally sterilize the distilled water which is obtained. FIGURES 2 and 3 are plan and elevational views respectively of the construction of the sterilizing apparatus which is indicated merely generally in FIGURE 1. FIGURE 4 in an elevation of a modification of the sterilizing apparatus.

In the operation illustrated in FIGURE 1, sea water is preheated by heat exchange as described subsequently, introduced into vacuum distilling chamber 10 through line 11, and subjected to conventional vacuum distillation. Distillate is removed through line 12 and condensed in condenser 13 by indirect heat exchange with cooling water. Condensate is introduced through line 14 into tank 15. Conventional vacuum producing means not shown are employed to maintain a vacuum in chamber 10 and on the distilled water side of condenser 13.

Distilled water is removed from tank 15 and introduced through line 16 into sterilizing apparatus 17. The distilled water in one embodiment is normally sterile. In another embodiment, because of entrainment and insufficiently high temperature in the distilation, it is normally not sterile. In the former case, the sterilization in apparatus 17 is a safety measure to insure production of sterilized water in the case where a leak develops in condenser 13 with resulting contamination of the distillate with unsterile cooling water. From apparatus 17, sterilized distilled water is removed through line 23 as the product of the sterilizing process. The further apparatus and operation illustrated in FIGURE 1 will be discussed subsequently.

Turning to FIGURES 2 and 3, line 16 is again shown, introducing the feed water into the sterilizing apparatus, which comprises a double coiled pipe assembly 19 which consists of an outer pipe 20 and an inner pipe 21. Feed water supply pipe 22 communicates with the lower end of the coiled inner pipe 21, and sterilized water removal pipe 23 communicates with the lower end of outer pipe 20. A pressure maintenance valve of known construction 24 is provided in pipe 23 and the downstream portion of the latter pipe constitutes line 18 as shown in FIGURE 1.

At the upper end 25 of the outer pipe 20, means as subsequently described are provided for the introduction of thermally sterilized water into the upper end of the outer pipe. A heater 26 is provided in the form of a separate section of outer pipe surrounding section 27 of the inner pipe, which latter section is connected through pipe section 28 to the lower portion of inner pipe 21 as previously described. A steam line 30 is adapted to introduce steam into one end of heater 26 and a condensate line 29 is adapted to remove condensate from the other end of heater 26.

Sterilized water removal pipe 32 communicates with the end of inner pipe 27 and is adapted to convey sterilized water to pump 34. Sterilized water supply pipe 36 is adapted to convey sterilized water from pump 34 to the upper end 25 of outer pipe 20.

A feed water supply pump 38 is provided which is adapted to pump raw water from line 16 through line 22 into the lower end of the inner pipe 21. Pumps 34 and 38 are mounted on the same shaft 44 and are driven by electric motor 42.

In operation, feed water is pumped by mans of pump 38 through lines 16 and 22 into the inner pipe 21. From the pipe 21 the water which has been preheated, by indirect heat exchage between the hot water in the annulus between pipes 20 and 21 and the water in pipe 21, passes through pipe section 28 into the inner pipe 27 of heater 26. The water is further heated by indirect heat exchange with steam to a sterilization temperature and issues from heater 26 through line 32 in sterilized condition. The sterilized water is pumped by means of pump 34 through line 36 into the upper end of the annular conduit between pipes 20 and 21 and passes downwardly through the annulus giving up heat to the water in pipe 21 during such passage. The cooled sterilized water is removed from the lower end of the annular conduit through line 23 and passes through pressure maintenance valve 24 into conduit 18. The water can then be passed into suitable tank or other receiving location not shown. Alternative operation illustrated in FIGURE 1 will be discussed subsequently.

Pump 34 is adapted to provide a pressure head which is greater than the sum of the pressure drops in the feed water conduit provided by the inner pipe, and in the sterilized water conduit provided by the annulus between the pipes 20 and 21. This makes it possible for the pressure at the lower or outlet end of the sterilized water heat exchange conduit to be greater than the pressure at the lower or inlet end of the feed water heat exchange conduit. This insures that throughout the heat exchange apparatus the pressure on the sterilized water side is greater than the pressure on the feed water side. Accordingly, any leak which may occur is from the sterilized water to the feed water side and does not result in contamination of the water removed through line 18.

The pump 38 provides lesser pressure head than the pump 34, since pump 38 is only required to provide pressure head sufficient to overcome the pressure drop on the feed water side of the apparatus, whereas pump 34 is required to provide a pressure head which is capable of overcoming the pressure drop on the sterilized water side and still providing a pressure at the outlet of the sterilized water side which is greater than the pressure at the inlet of the feed water side.

In order to insure the proper relationship of pressures within the system, the pumps 38 and 34 are preferably mounted on the same shaft as illustrated in the drawing, the pump 34 being so constructed that it provides a greater pressure head at a given r.p.m. than the pump 38. In this manner, so long as liquid is being pumped by pump 38 into the raw water side of the apparatus, the pump 34 will pump sterilized water into the other side of the apparatus at a pressure sufficient to prevent leakage from the raw water side to the sterilized water side.

The pressure maintenance valve 24 or some other flow control means in line 23 is essential in order to maintain, upon the water in the sterilized water side of the apparatus, a controlled back pressure which is independent of flow rate, and thereby maintain the necessary elevated pressure on the sterilized water side.

Typical examples of temperatures and pressures in the operation described previously include the following:

| Stream | Location | Temp., °F. | Pres., p.s.i. |
|---|---|---|---|
| Feed water | Central conduit 21, lower end. | 115 | 10 |
| Cooled sterilized water | Annular conduit 20, lower end. | 125 | 15 |
| Preheated feed water | Central conduit 21, upper end. | 220 | 7 |
| Sterilized water | Annular conduit 20, upper end. | 230 | 20 |
| Depressured sterilized water | Line 18 | | 5 |

The first two locations above are the cold and hot sides respectively of the lower end of the double pipe assembly 19, i.e. where the pipe 22 enters the pipe 20 and becomes central conduit 21. The third and fourth locations are the cold and hot sides respectively of the upper end 25 of the double pipe 19.

Turning again to FIGURE 1:

Alternatively to the passage of the sterilized water through valve 24 as shown therein, the sterilized water can be passed through line 52 into cooler 54 where it passes in indirect heat exchange with the sea water feed to tower 10. The sea water is preheated, and the sterilized water further cooled by this operation. The cooled sterilized water is removed through line 56, in which diaphragm valve 58 is located. This valve operates, by known pressure control means, to maintain the pressure in line 58 greater than the pressure in the line 62 carrying sea water to cooler 54. Valve 58 thus serves the dual purpose of preventing leakage from the sea water side to the sterilized water side in cooler 54, and also of providing the necessary controlled back pressure on the sterilized water side of sterilizer 17. The depressured and cooled sterilized water is passed through line 60 to suitable tank or other receiving location not shown.

Typical examples of temperatures and pressures in this operation include the following:

| Stream | Location | Temp., °F. | Pres., p.s.i. |
|---|---|---|---|
| Feed water | Central conduit 21, lower end. | 150 | 10 |
| Cooled sterilized water | Annular conduit 20, lower end. | 160 | 30 |
| Preheated feed water | Central conduit 21, upper end. | 220 | 7 |
| Sterilized water | Annular conduit 20, upper end. | 230 | 35 |
| Further cooled sterilized water. | Line 56 | | 25 |
| Depressured sterilized water | Line 60 | | 5 |
| Raw water coolant | Line 62 | | 20 |

Water from any suitable source can be distilled and sterilized according to the invention, e.g. seat water etc. The invention can also be applied in other known sterilization processes for use with other liquids.

The invention is not limited to sterilization processes, but is also useful in thermal processes where chemical, rather than biological, change is brought about by the heating. In such processes, the charge stock for the chemical reaction passes through the part of the heat exchager upstream from heater 26, then through the heater and the downstream part of the heat exchanger. As a result of the heating, chemical conversion takes place, and the liquid downstream from the heater is a reaction product obtained by thermal conversion from the charge stock. The invention is useful in preventing, as described previously, the contamination of the reaction product in the downstream part with the charge stock in the upstream part of the heat exchanger.

In FIGURE 4, sterilizing and degasifying apparatus is shown which is similar to that shown in FIGURES 2 and 3, but employs direct heating of water by means of steam, rather than the indirect heating which is provided by the heater 26 in FIGURES 2 and 3.

In the apparatus of FIGURE 4, the elements which are numbered the same as elements in FIGURES 2 and 3 are the same in construction and function as their counterparts in the latter figures. The pipe section 28 connects the inner pipe 21 with heater 70, which is for example a cylindrical vessel containing stainless steel or Monel packing. An inlet 72 for deaerated steam to heater 70 is provided, and an outlet 74 for air and steam from heater 70 is also provided. Sterilized water removal pipe 32 connects the bottom of heater 70 with pump 34. Vent control valve 82 in line 74 is adapted to maintain a constant temperature, e.g., 205° F., of the outlet steam, thereby fixing the ratio of steam to gas in the effluent; this feature is not essential, however. Valve 78 in inlet 72 is controlled in accordance with the pressure in heater 70, which is measured by means not shown, and actuates valve 78 through connection 80, in order to maintain a desired pressure in the heater. Usually, the latter pressure is in the range from 0.5 to 10 p.s.i.g.

The operation in FIGURE 4 is essentially the same as in FIGURES 2 and 3 except that the water which has been preheated during passage through pipe 21, passes through pipe section 28 into the top of heater 70, wherein its is heated to sterilization temperature by direct heat exchange with steam introduced through line 72. The steam removes dissolved gases, e.g., air, from the water, and steam and the removed gases are withdrawn through line 74. The sterilized and degasified water issues from heater 70 through line 32. A conventional level control or automatic overflow seal can be employed to prevent water hammer and flooding of the heater-degasifier 70.

The embodiment illustrated in FIGURE 4 has the following advantages:

Electrical conductivity instruments have been used for many years to continuously monitor the quality of the effluent from sea water distillation equipment. One of the problems with such instruments is that traces of certain dissolved gases such as $CO_2$ and ammonia have appreciable electrical conductivity. The electrical conductivity instrument thus normally reports the total conductivity of the traces of dissolved salts and the traces of dissolved gases in the distilled water. For most sea water distillers, the removal of the soluble salts from the distilled water is more complete than the removal of the $CO_2$ and ammonia so far as electrical conductivity measurements are concerned. For sea water distillers, the electrical conductivity meters are usually calibrated in terms of equivalent NaCl, and an experienced engineer will know that the lower the conductivity instrument readings, the more significant becomes the gas conductivity correction.

There are several ways in which the electrical conductivity instrument can be continuously corrected for the gas conductivity. In the past, these methods usually involved elimination of the gases only from the sample stream because it has been difficult to remove essentially all of the dissolved gases from the main stream by previously known arrangements. Also the control problems in removing the gases from a sample stream are still present even though miniature equipment is involved, and these problems have been difficult in the past.

In the embodiment of FIGURE 4, the operation of the heater 70 removes most of the dissolved gases from the main stream of the distilled water, in addition to sterilizing the water. The control problems of side stream degasifiers are simplified when the entire stream is degasified, and this is accomplished in the FIGURE 4 embodiment without significantly increasing the heat requirements. Effluent water from line 18 can be introduced into a conventional electrical conductivity instrument for measurement of dissolved salt content.

The combination sterilizer-degasifier for sea water distillers is particularly useful for sea water distillers for ships having pressurized water reactor nuclear boilers of stainless steel construction in which it is necessary to use feed water having unusually low chloride content. The chloride content of such feed water must be kept so low that the magnitude of the electrical conductivity of traces of dissolved $CO_2$ and ammonia in the distilled water produced at sea and in river estuaries by distillers without this degasifying refinement, will be many times the magnitude of the electrical conductivity of the dissolved salts.

It is within the scope of the invention to use the apparatus of the present invention as an analytical tool to sterilize and degasify a sample removed from a main stream of water, but the principal utility of the apparatus is for the sterilization of the main stream.

It is to be understood that the apparatus of the present invention can be operated, with certain modifications within the scope of the invention, in reverse flow from that previously described. Thus, in FIGURES 2 and 3, instead of passing raw water upwardly through inner pipe 21 and passing sterilized water downwardly through the annulus between the inner and outer pipes 21 and 20, the raw water can be passed upwardly through that annulus and the sterilized water downwardly through the inner pipe 21. In this embodiment, the pipe 18 is the raw water inlet, and a pump such as the pump 38 is provided, instead of the valve 24, in that line. The pipe 22 in this embodiment is the sterilized water outlet, and a valve such as the valve 24, instead of the pump 38, is provided in that line. Similarly, reverse flow can be provided in the apparatus of FIGURE 4 by suitable modifications as will be apparent to the person skilled in the art. Thus, in this embodiment, the pipe 18 is the raw water inlet, and a pump such as the pump 38 is provided, instead of the valve 24, in that line; the pipe 22 in this embodiment is the sterilized water outlet, and a valve such as the valve 24, instead of the pump 38, is provided in that line.

The invention claimed is:

1. Apparatus for regeneratively heating and cooling liquid which comprises a coiled inner pipe having an inlet and an outlet end, a coiled outer pipe surrounding said inner pipe and forming an annulus therewith, said annulus having a closed inlet and adjacent the outlet end of said inner pipe, a raw liquid inlet pipe communicating with the inlet end of said inner pipe, a preheated product liquid outlet pipe communicating with the outlet end of said annulus, a first pump adapted to transport liquid from said inlet pipe into said inner pipe, a heating vessel, a pipe connecting the outlet end of said coiled inner pipe with the top of said heating vessel, a heating fluid inlet pipe communicating with said heating vessel to provide direct contact of heating fluid with preheated liquid in said heating vessel, a heating fluid outlet pipe communicating with said heating vessel, a heated liquid pipe connecting the bottom of said heating vessel with the inlet end of the first-named annulus, a second pump adapted to transport liquid from the bottom of said heating vessel to the inlet end of the first-named annulus and to provide a pressure head greater than the sum of the pressure head at the inlet end of said coiled inner pipe and of the pressure drop in said first-named annulus, and downstream flow control means adapted to maintain the pressure at the outlet end of said first-named annulus above the pressure at the inlet end of said coiled inner pipe, said first pump and said second pump being driven from the same shaft; whereby liquid passes through said coiled inner pipe as raw liquid in indirect heat exchange with heated liquid as subsequently recited, then passes through said heating vessel in direct heat exchange with heating fluid, and then passes as heated liquid through said first-named annulus in indirect heat exchange with raw liquid as previously recited.

2. Apparatus for regeneratively heating and cooling liquid which comprises a coiled inner pipe having an inlet and an outlet end, a coiled outer pipe surrounding said inner pipe and forming an annulus therewith, said annulus having an inlet end adjacent the outlet end of said inner pipe, a raw liquid inlet pipe communicating with the inlet end of said annulus, a preheated product liquid outlet pipe communicating with the outlet end of said inner pipe, a first pump adapted to transport liquid from said inlet pipe into said annulus, a heating vessel, a pipe connecting the outlet end of said annulus with the top of said heating vessel, a heating fluid inlet pipe communicating with said heating vessel to provide direct contact of heating fluid with preheated liquid in said heating vessel, a heating fluid outlet pipe communicating with said heating vessel, a heated liquid pipe connecting the bottom of said heating vessel with the inlet end of said inner pipe, a second pump adapted to transport liquid from the bottom of said heating vessel to the inlet end of said inner pipe and to provide a pressure head greater than the sum of the pressure head at the inlet end of said annulus and of the pressure drop in said inner pipe, and downstream flow control means adapted to maintain the pressure at the outlet end of said inner pipe above the pressure at the inlet end of said annulus, said first pump and said second pump being driven from the same shaft; whereby liquid passes through said annulus as raw liquid in indirect heat exchange with heated liquid as subsequently recited, then passes through said heating vessel in direct contact heat exchange with heating fluid, and then passes as heated liquid through said inner pipe in indirect heat exchange with raw liquid as previously recited.

References Cited by the Examiner

UNITED STATES PATENTS

| 1,745,906 | 2/1930 | O'Connell et al. | 165—66 X |
| 2,512,045 | 6/1950 | Steinburg et al. | 165—66 X |

FOREIGN PATENTS

| 538,399 | 6/1955 | Belgium. |

ROBERT A. O'LEARY, Primary Examiner.

CHARLES SUKALO, Examiner.